Oct. 18, 1927.
D. F. FESLER
1,645,901
LUBRICANT RECEPTACLE
Filed Nov. 28, 1921
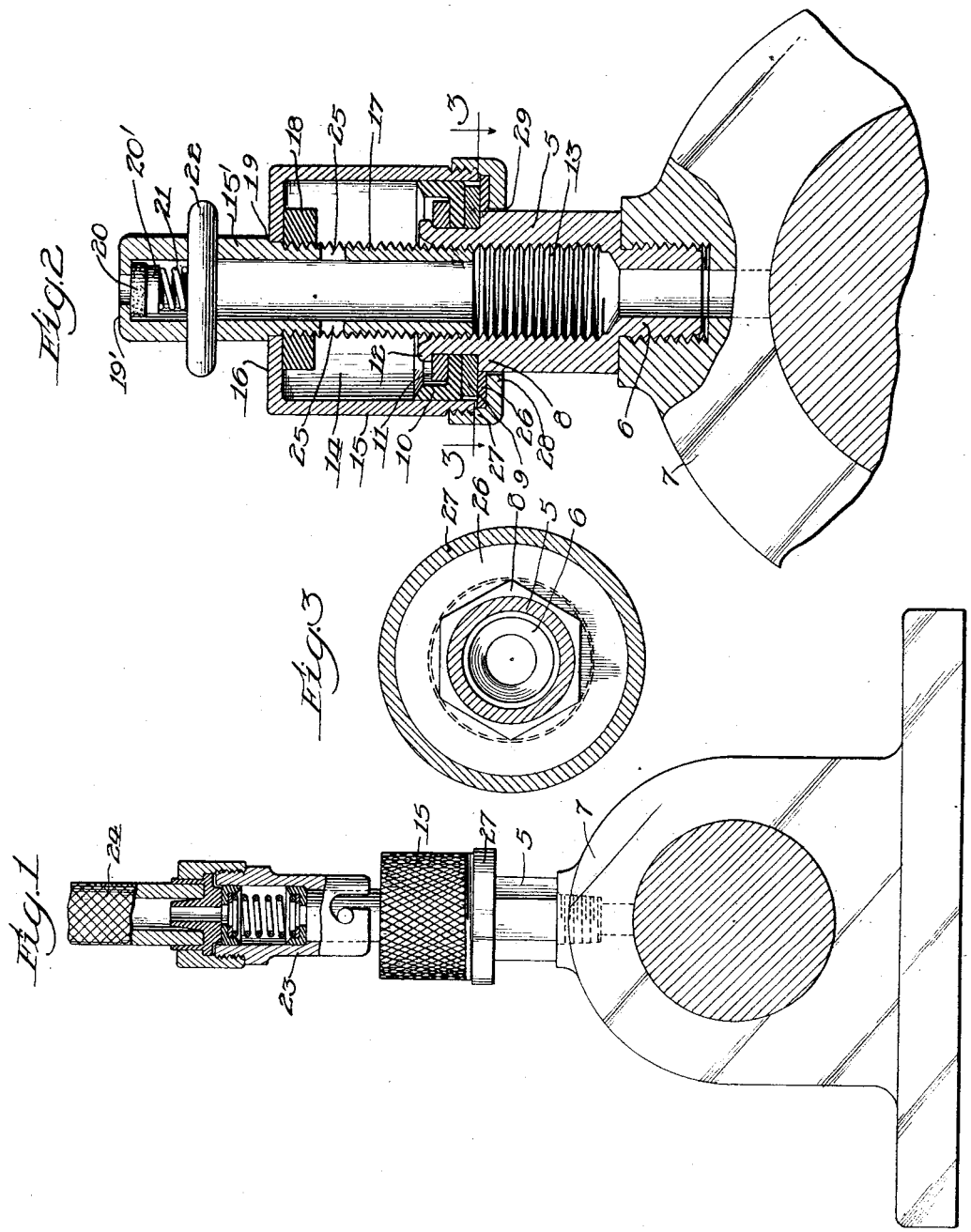

Patented Oct. 18, 1927.

1,645,901

UNITED STATES PATENT OFFICE.

DOUGLAS F. FESLER, OF CHICAGO, ILLINOIS, ASSIGNOR TO THE BASSICK MANUFACTURING COMPANY, OF CHICAGO, ILLINOIS, A CORPORATION OF ILLINOIS.

LUBRICANT RECEPTACLE.

Application filed November 28, 1921. Serial No. 518,212.

My invention relates to improvements in lubricant receptacles, and is particularly concerned with the provision of a novel lubricant receptacle designed to form a part of a high pressure lubricating system of a type well known, and which comprises a plurality of fittings or nipples to be secured to the bearings of a machine to be lubricated, and a high pressure compressor having a discharge conduit provided with a coupling for making successive connections with the fittings or nipples whereby lubricant under high pressure can be successively supplied to the various bearings.

The objects of my invention are,

First, to provide a lubricant receptacle to take the place of the nipples or fittings referred to, this receptacle being constructed to hold a reserve supply of lubricant which can be forced into the bearing at successive intervals of time without the necessity of employing a lubricant compressor;

Second, to provide a receptacle of the character described comprising means for excluding dust and dirt therefrom; and Third, to provide a receptacle of the character described which is of rugged and simple construction and economical to manufacture.

Other objects of my invention will appear as this description progresses, reference being had to the accompanying drawings in which Figure 1 is a view showing a bearing equipped with my improved lubricant receptacle which is shown in side elevation, Figure 2 is a central longitudinal section through my improved lubricant receptacle, and Figure 3 is a transverse section taken on the line 3 of Figure 2.

Referring to the drawings, my improved lubricant receptacle comprises a discharge conduit 5, the exterior of which is preferably polygonal in form for receiving the jaws of a wrench whereby the inner threaded end 6 thereof can be secured to a bearing 7. The outer end of the discharge conduit 5 is reduced in diameter to provide a shoulder 8 which acts as an abutment for a plunger comprising the back plate 9, the cup leather 10 and the face plate 11. The outer end of the discharge conduit is swedged as shown at 12 to hold the plunger in place. The bore of the discharge conduit 5 is internally threaded as shown at 13.

A receptacle 14 comprising a cylindrical wall 15 and an end wall 16 receives the plunger and is slidably mounted thereupon. A filling conduit 15' extends through the end wall 16 of the receptacle, the inner end of this conduit being provided with external threads 17 for coacting with the internal threads 13 of the discharge conduit. A nut 18 coacts with the shoulder 19 formed on the discharge conduit to secure the latter to the receptacle 14. The outer end of the discharge conduit is flanked over, as shown at 19', to provide a seat for the check valve or closure which comprises the leather disc 20 and the metal back plate or follower 20', both of which are slightly less in diameter than the bore of the conduit 15'. The closure is yieldingly held in its closed position by a suitable spring 21 confined between it and the pin 22 which extends through and beyond opposite walls of the discharge conduit.

The pin 22 not only acts as an abutment for the spring 21 but provides means for making a detachable connection with the sleeve 23 of a coupling member which is secured to the free end of the discharge conduit 24 of a lubricant compressor, not shown. The details of this coupling are well known to those skilled in the art and need not be further described. It is sufficient to state that when the coupling is secured to the outer end of the discharge conduit, as shown in Figure 1, the compressor can be operated to force lubricant under high pressure through the filling conduit 15' and the discharge conduit 5 into the bearing to be lubricated.

All bearings provide a certain amount of resistance which will cause the lubricant to flow through the openings 25 in the filling conduit and into the receptacle 14 which will thus be filled with lubricant. After the receptacle 14 has been completely filled with lubricant, any additional pressure exerted by the compressor will force the lubricant between the surfaces to be lubricated, and in this manner the contaminated used lubricant can be displaced from the bearing and replaced by fresh lubricant. The compressor can then be detached from the lubricant receptacle, and for a period of time thereafter additional lubricant can be supplied to the bearing from time to time by merely turning the receptacle 14 and the filling conduit 15' in the proper direction to cause the threaded end of the latter to move inwardly in the threaded bore of the discharge conduit. As this takes place, the plunger moves into the receptacle 14, discharging the lubricant therefrom through the openings 25, the inner end of the filling conduit and the discharge conduit into the bearing.

For the purpose of excluding dust from the end of the receptacle 14 as it moves downwardly over the plunger, I provide the flat dust ring 26 which has a central opening conforming to the exterior periphery of the discharge conduit. This ring is secured to the inner end of the receptacle 14 by means of the collar 27, the dust ring 26 being confined between the inner edge of the lubricant receptacle and the inwardly extending flange 28 of the collar 27. The opening 29 formed by the flange 28 of the collar 27 is circular in form so as to permit its rotation about the discharge conduit.

While I have described the details of construction of the preferred embodiment of my invention, it is to be clearly understood that my invention is not limited to these details, but is capable of other modifications within the scope of the appended claims.

Having thus described my invention, what I claim is:—

1. A lubricant receptacle comprising a discharge conduit to be secured to a bearing to be lubricated, said discharge conduit being internally threaded, a plunger mounted on the outer end of said discharge conduit, a receptacle enclosing said plunger and slidable thereon, said plunger forming a sealing member between one end of said receptacle and said discharge conduit, a filling conduit secured to and passing through the opposite end of said receptacle, the inner end of said filling conduit having threads thereon for coacting with the internal threads of said discharge conduit, the outer end of said filling conduit being provided with a closure and means for making a detachable sealed connection with a lubricant compressor, said last named means serving as means whereby said receptacle can be rotated, and a dust excluding ring surrounding said discharge conduit and carried by the inner end of said receptacle.

2. A lubricant receptacle comprising a discharge conduit to be secured to a bearing to be lubricated, said discharge conduit being threaded, a plunger mounted on the outer end of said discharge conduit, a receptacle enclosing said plunger and slidable thereon, said plunger forming a sealing member between one end of said receptacle and said discharge conduit, and a filling conduit secured to and passing through the opposite end of said receptacle, the inner end of said filling conduit having threads thereon for coacting with the threads of said discharge conduit, the outer end of said filling conduit being provided with a closure and means for making a detachable sealed connection with a lubricant compressor.

3. A lubricant receptacle comprising a discharge conduit to be secured to a bearing to be lubricated, said discharge conduit being threaded, a plunger mounted on the outer end of said discharge conduit, a receptacle enclosing said plunger and slidable thereon, said plunger forming a sealing member between one end of said receptacle and said discharge conduit, and a filling conduit secured to and passing through the opposite end of said receptacle, the inner end of said filling conduit having threads thereon for coacting with the threads of said discharge conduit, the outer end of said filling conduit being provided with a closure.

4. A lubricant receptacle comprising a tubular discharge conduit for attachment to a bearing to be lubricated, a plunger carried by said discharge conduit, a filling conduit having one end movable longitudinally in the outer end of said discharge conduit and in fluid-tight relation thereto, a receptacle carried by said filling conduit and enclosing said plunger, said receptacle communicating with said filling conduit, coacting means carried by said discharge conduit and said filling conduit whereby said receptacle can be moved upon said plunger, and means carried by said filling conduit for making a detachable connection with a lubricant compressor, said connecting means also serving to move said receptacle on said plunger.

5. A lubricant receptacle comprising a tubular discharge conduit for attachment to a bearing to be lubricated, a plunger carried by said discharge conduit, a filling conduit having one end movable longitudinally in the outer end of said discharge conduit and in fluid-tight relation thereto, a receptacle carried by said filling conduit and enclosing said plunger, said receptacle communicating with said filling conduit, and coacting means carried by said discharge conduit and said filling conduit whereby said receptacle can be moved upon said plunger.

6. A lubricant receptacle comprising a discharge conduit, a filling conduit, one movable within the other in fluid-tight relation, a plunger carried by one of said conduits, a receptacle enclosing said plunger, and carried by the other of said conduits, a check valve in said filling conduit, and means carried by said filling conduit for making a detachable connection with a lubricant compressor.

7. A lubricant receptacle comprising a discharge conduit, a filling conduit, one movable within the other in fluid-tight relation, a plunger carried by one of said conduits, and a receptacle carried by the other of said conduits and slidably receiving said plunger.

In witness whereof, I hereunto subscribe my name this 9th day of November, 1921.

DOUGLAS F. FESLER.